US011068714B2

(12) United States Patent
Zhao

(10) Patent No.: US 11,068,714 B2
(45) Date of Patent: Jul. 20, 2021

(54) METHOD AND APPARATUS FOR DETERMINING HOT ZONES OF HUMAN FLOW BASED ON CARTOGRAPHY

(71) Applicant: BOE Technology Group Co., Ltd., Beijing (CN)

(72) Inventor: Zhengong Zhao, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 126 days.

(21) Appl. No.: 16/496,213

(22) PCT Filed: Mar. 27, 2019

(86) PCT No.: PCT/CN2019/079900
§ 371 (c)(1),
(2) Date: Sep. 20, 2019

(87) PCT Pub. No.: WO2019/201065
PCT Pub. Date: Oct. 24, 2019

(65) Prior Publication Data
US 2020/0380256 A1    Dec. 3, 2020

(30) Foreign Application Priority Data
Apr. 20, 2018 (CN) .......................... 201810359674.9

(51) Int. Cl.
*G06K 9/00* (2006.01)
*G06T 7/44* (2017.01)
(Continued)

(52) U.S. Cl.
CPC ....... *G06K 9/00637* (2013.01); *G06K 9/3233* (2013.01); *G06T 7/44* (2017.01); *G06T 7/73* (2017.01)

(58) Field of Classification Search
CPC ............. G06K 9/00637; G06K 9/3233; G06K 9/0063; G06T 7/44; G06T 7/73; G06T 11/203; G06T 11/206
See application file for complete search history.

(56) References Cited

U.S. PATENT DOCUMENTS
2011/0075882 A1    3/2011  Guo et al.

FOREIGN PATENT DOCUMENTS
CN    102254786 A    11/2011
CN    103942854 A    7/2014
(Continued)

OTHER PUBLICATIONS

First Office Action, including Search Report, for Chinese Patent Application No. 201810359674.9, dated Dec. 10, 2019, 13 pages.
(Continued)

*Primary Examiner* — Siamak Harandi
(74) *Attorney, Agent, or Firm* — Westman, Champlin & Koehler, P.A.

(57) ABSTRACT

The present disclosure discloses a method and apparatus for determining hot zones of a human flow based on cartography. The method includes: performing statistics on density data of the human flow at each coordinate point in a region for a period of time; after the density data of the human flow at each coordinate point is used as height data at the coordinate point, drawing contours in the region by using cartography according to the height data; and after the drawn contours are used as equidensity lines of the human flow, determining the hot zones of the human flow in the region according to ranges enclosed by the equidensity lines of the human flow. With the present disclosure, a small amount of calculation is required for determining the hot zones of the
(Continued)

human flow, and the hot zones of the human flow may be rapidly determined, to realize real-time calculation and display.

20 Claims, 5 Drawing Sheets

(51) Int. Cl.
   *G06T 7/73*   (2017.01)
   *G06K 9/32*   (2006.01)

(56) References Cited

FOREIGN PATENT DOCUMENTS

| CN | 104200502 A | 12/2014 |
| CN | 106407466 A | 2/2017 |
| CN | 106708955 A | 5/2017 |
| CN | 107644218 A | 1/2018 |
| CN | 108564638 A | 9/2018 |

OTHER PUBLICATIONS

Kikita, "Density analysis of spatial analysis", Original link: https://blog.csdn.net/kikitaMoon/java/article/details/7835942, Read No. 92512, dated Aug. 6, 2012, 17 pages.

METHOD AND APPARATUS FOR DETERMINING HOT ZONES OF HUMAN FLOW BASED ON CARTOGRAPHY

CROSS-REFERENCE TO RELATED APPLICATION(S)

This application claims priority to PCT Application No. PCT/CN2019/079900, filed on Mar. 27, 2019, entitled "METHOD AND APPARATUS FOR DETERMINING HOT ZONES OF HUMAN FLOW BASED ON CARTOGRAPHY", which claims priority to the Chinese Patent Application No. 201810359674.9, filed on Apr. 20, 2018, entitled "METHOD AND APPARATUS FOR DETERMINING HOT ZONES OF HUMAN FLOW BASED ON CARTOGRAPHY", which are incorporated herein by reference in their entireties.

TECHNICAL FIELD

The present disclosure relates to the field of data mining, and more particularly, to a method and apparatus for determining hot zones of a human flow based on cartography.

BACKGROUND

A hot zone map of a human flow is an image which is generated to indicate a level of a density of the human flow such as pedestrians in a current scene by estimating of positions of the pedestrians in the current scene. The hot zone map technology of the human flow has a wide range of applications in fields such as human flow analysis, security monitoring etc. For example, in the security monitoring, a security department may determine positions where a human flow is most active through the hot zone map of the human flow and determine the positions as key regions to be monitored. In the human flow analysis, a region where pedestrians are active for a period of time may be represented using the hot zone map of the human flow for subsequent high-level analysis.

SUMMARY

According to an aspect of the present disclosure, there is provided a computer-implemented method for determining hot zones of a human flow based on cartography. The method comprises:
  determining height data at each coordinate point in a region in the cartography sense based on density data of the human flow at the coordinate point for a period of time;
  drawing contours in the region by using cartography according to the height data; and
  determining the hot zones of the human flow in the region according to ranges enclosed by the drawn contours.
  In some embodiments, the step of determining height data at each coordinate point in a region in the cartography sense based on density data of the human flow at the coordinate point for a period of time comprises:
  using the density data of the human flow at each coordinate point directly as the height data at the corresponding coordinate point in the cartography sense.
  In some embodiments, the step of determining the hot zones of the human flow in the region according to ranges enclosed by the drawn contours comprises:
  determining the drawn contours as equidensity lines of the human flow; and
  determining the hot zones of the human flow in the region according to the ranges enclosed by the equidensity lines of the human flow.
  In some embodiments, the step of determining the hot zones of the human flow in the region according to the ranges enclosed by the equidensity lines of the human flow comprises:
  selecting ranges enclosed by equidensity lines of the human flow each having a hot degree greater than a set hot degree value as the hot zones of the human flow in the region; or
  selecting ranges enclosed by equidensity lines of the human flow each having a density of the human flow higher than a set threshold as the hot zones of the human flow in the region.
  In some embodiments, the step of determining the hot zones of the human flow in the region according to the ranges enclosed by the equidensity lines of the human flow comprises:
  selecting ranges enclosed by equidensity lines of the human flow each having a hot degree greater than a set hot degree value as candidate hot zones; and
  determining candidate hot zones each having an area greater than a set area as the hot zones of the human flow in the region.
  In some embodiments, the method further comprises:
  sorting the determined hot zones of the human flow according to hot degrees; and
  marking the hot zones of the human flow in different colors on a display interface according to a sorting result.
  In some embodiments, the step of drawing contours in the region by using cartography according to the height data comprises:
  for grid units which are obtained by uniformly dividing the region, comparing height data at a coordinate point corresponding to each of the grid units with a set height value;
  marking, in response to height data at a coordinate point corresponding to a grid unit being greater than the set height value, an upper left corner of the grid unit in black;
  drawing corresponding outlines in the grid unit according to conditions in which four corners of the grid unit are marked in black; and
  forming contours in the region each having a height marked as the set height value from respective outlines in the grid units,
  wherein the set height value is equal to a set density value of the human flow.
  According to another aspect of the present disclosure, there is provided an apparatus for determining hot zones of a human flow based on cartography, the apparatus comprising:
  a processor; and
  a memory having stored thereon instructions, which when executed by the processor, cause the processor to:
    determine height data at each coordinate point in a region in the cartography sense based on density data of the human flow at the coordinate point for a period of time;
    draw contours in the region by using cartography according to the height data; and
    determine the hot zones of the human flow in the region according to ranges enclosed by the drawn contours.
  In some embodiments, the instructions, when executed by the processor, further cause the processor to:

use the density data of the human flow at each coordinate point directly as the height data at the corresponding coordinate point in the cartography sense.

In some embodiments, the instructions, when executed by the processor, further cause the processor to:
determine the drawn contours as equidensity lines of the human flow; and
determine the hot zones of the human flow in the region according to the ranges enclosed by the equidensity lines of the human flow.

In some embodiments, the instructions, when executed by the processor, further cause the processor to:
select ranges enclosed by equidensity lines of the human flow each having a hot degree greater than a set hot degree value as the hot zones of the human flow in the region; or
select ranges enclosed by equidensity lines of the human flow each having a density of the human flow higher than a set threshold as the hot zones of the human flow in the region.

In some embodiments, the instructions, when executed by the processor, further cause the processor to:
select ranges enclosed by equidensity lines of the human flow each having a hot degree greater than a set hot degree value as candidate hot zones; and
determine candidate hot zones each having an area greater than a set area as the hot zones of the human flow in the region.

In some embodiments, the instructions, when executed by the processor, further cause the processor to:
sort the determined hot zones of the human flow according to hot degrees; and
mark the hot zones of the human flow in different colors on a display interface according to a sorting result.

In some embodiments, the instructions, when executed by the processor, further cause the processor to:
for grid units which are obtained by uniformly dividing the region, compare height data at a coordinate point corresponding to each of the grid units with a set height value;
mark, in response to height data at a coordinate point corresponding to a grid unit being greater than the set height value, an upper left corner of the grid unit in black;
draw corresponding outlines in the grid unit according to conditions in which four corners of the grid unit are marked in black; and
form contours in the region each having a height of the set height value from respective outlines in the grid units, wherein the set height value is equal to a set density value of the human flow.

According to yet another aspect of the present disclosure, there is provided a non-transitory computer readable storage medium having stored thereon instructions which, when executed by a processor, enable the processor to perform the method described above.

BRIEF DESCRIPTION OF THE ACCOMPANYING DRAWINGS

In order to more clearly illustrate the technical solutions in the embodiments of the present disclosure, the accompanying drawings required to be used in the description of the embodiments will be briefly described below. Obviously, the accompanying drawings in the following description are only some embodiments of the present disclosure. Other accompanying drawings may also be obtained by those of ordinary skill in the art according to these accompanying drawings without any creative work.

DETAILED DESCRIPTION

Figure 1:
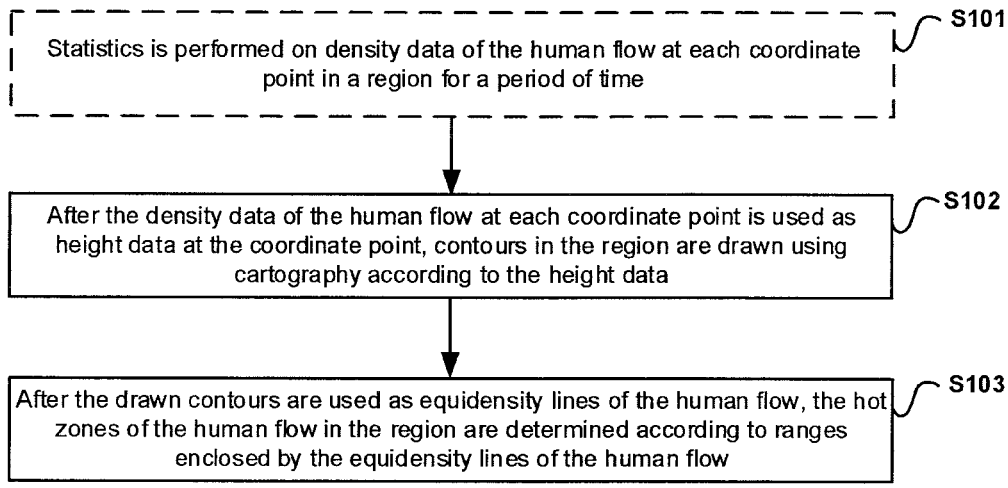
FIG. 1 is a flowchart of an exemplary method for determining hot zones of a human flow based on cartography according to an embodiment of the present disclosure.

In order to make the purposes, technical solutions and advantages of the present disclosure more clear and apparent, the present disclosure will be further described in detail below in conjunction with specific embodiments and with reference to the accompanying drawings.

The embodiments of the present disclosure will be described in detail below. Examples of the embodiments are illustrated in the accompanying drawings, in which the same or similar reference signs denote the same or similar elements or elements having the same or similar functions throughout. The embodiments described below with reference to the accompanying drawings are exemplary, are used only to explain the present disclosure, and cannot be construed as limiting the present disclosure.

It will be understood by those skilled in the art that the singular forms "a," "an," "the," and "this" used here may also comprise plural forms unless specifically stated. As used here, the phrase "and/or" comprise all or any of one or more of the associated listed items or a combination thereof.

It should be illustrated that all the expressions using "first" and "second" in the embodiments of the present disclosure are merely used for distinguishing between two different entities or parameters with the same name. Thus, "first" and "second" are used for the convenience of description only, and should not be understood as limitations on the embodiments of the present disclosure, which will not be repeated again in the subsequent embodiments.

In the existing method for determining hot zones of a human flow, hot degrees of the human flow are usually calculated based on a density clustering algorithm, and then hot zones of the human flow are circled according to the calculated hot degrees of the human flow. However, the density clustering algorithm causes a large amount of calculation and a slow convergence rate, and therefore, it is difficult to realize real-time calculation and display of the hot zones of the human flow.

In some embodiments of the present disclosure, density data of the human flow at each coordinate point in the region may be used as height data at the coordinate point, equidensity lines of the human flow may then be obtained rapidly using a method for calculating contours in the cartography, and the hot zones may be determined based on the equidensity lines of the human flow. Since the algorithm of calculating contours in the cartography is simple and rapid, in some embodiments of the present disclosure, the hot zones are determined using the cartography, which results in a small amount of calculation, and the hot zones of the human flow may be rapidly determined, to realize the real-time calculation and display of the hot zones. As used herein, the term "density of the human flow" refers to a number of humans or objects visible in a region per unit area.

Further, it should be illustrated that although the hot zones of the human flow are mainly determined by taking humans as objects herein, the present disclosure is not limited thereto, and the present disclosure may be applied to determination of hot zones for any actual objects. For example, in farms, zoos or safari parks, or in the wild, the present disclosure may be used to determine hot zones where animals are concentrated. Further, in an automated factory, for example, hot zones of non-living objects such as robots etc. may be determined by taking the objects as targets, and in road traffic monitoring, hot zones of non-living objects such as vehicles etc. may be determined by taking the objects as targets. Therefore, "human flow" and "object flow" may be used interchangeably herein as synonyms.

The technical solutions according to the present disclosure will be described in detail below with reference to the accompanying drawings.

A specific flow of a computer-implemented method for determining hot zones of a human flow based on cartography according to an embodiment of the present disclosure may be as shown in FIG. 1, and comprises the following steps.

In step S101, statistics is performed on density data of the human flow at each coordinate point in a region for a period of time.

For example, in some embodiments, a video of a surveillance video tape for the region may be analyzed, to collect data of the human flow in the region, comprising coordinates of humans and time points of the video. Thereby, human flows with the same coordinates for a period of time are accumulated into a human flow volume, so as to count up density data of the human flow at each coordinate point in the region for the period of time. Further, it should be illustrated that this step S101 may be an optional step. For example, in a case where historical data is studied, existing density data of the human flow may be used without instantly performing statistics on the density data of the human flow.

In step S102, after the density data of the human flow at each coordinate point is used as height data at the coordinate point, contours in the region are drawn using cartography according to the height data.

In this step, a specific method for drawing the contours in the region by using cartography according to the height data at each coordinate point in the region will be described in detail later. However, it should be illustrated that the present disclosure is not limited thereto. For example, in some other embodiments, the height data at each coordinate point may also be pre-processed variously instead of being directly used as height data in the cartography sense. For example, in some embodiments, data which is obviously erroneous in the density data of the human flow, for example, data having a density of the human flow exceeding an actual density limit of the human flow etc., may be removed.

In step S103, after the drawn contours are used as equidensity lines of the human flow, the hot zones of the human flow in the region are determined according to ranges enclosed by the equidensity lines of the human flow.

In this step, the hot zones of the human flow may be selected according to a set rule. In some embodiments, ranges enclosed by equidensity lines of the human flow each having a hot degree greater than a set hot degree value may be selected as the hot zones of the human flow in the region. For example, ranges enclosed by equidensity lines of the human flow each having a hot degree greater than 200 are selected as the hot zones of the human flow in the region. Here, the hot degree=a sum of hot degree values in the region/an area of the region, and the sum of hot degree values in a range=a sum of densities of the human flow at all coordinate points in the range.

Alternatively, ranges enclosed by equidensity lines of the human flow each having a density of the human flow higher than a set threshold are selected as the hot zones of the human flow in the region.

It should be illustrated that the term "equidensity lines of the human flow" as used herein has a similar meaning to "contours" in the cartography. In other words, the equidensity lines of the human flow may refer to lines formed by points having the same density of the human flow in the region, that is, all points on an equidensity line of the human flow have the same density of the human flow.

In some other embodiments, when the hot zones of the human flow are selected, an area factor may also be considered in addition to considering a hot degree factor. That is, ranges enclosed by equidensity lines of the human flow each having a hot degree greater than a set hot degree value are selected as candidate hot zones; and candidate hot zones each having an area greater than a set area are determined as the hot zones of the human flow in the region. For example, candidate hot zones each having an area greater than 2 square meters are determined as the hot zones of the human flow in the region.

In still some other embodiments, after a plurality of hot zones of the human flow are selected, the determined hot zones of the human flow may further be sorted according to hot degrees; and the respective hot zones of the human flow are matched to different colors according to a sorting result, so as to mark the respective hot zones of the human flow in different colors on a display interface. For example, hot zones of the human flow with decreasing hot degrees in the sorting result are matched to deep red, red, water red, yellow, and blue, so that a distribution of the hot zones with different hot degrees may be more intuitively understood.

Figure 2:
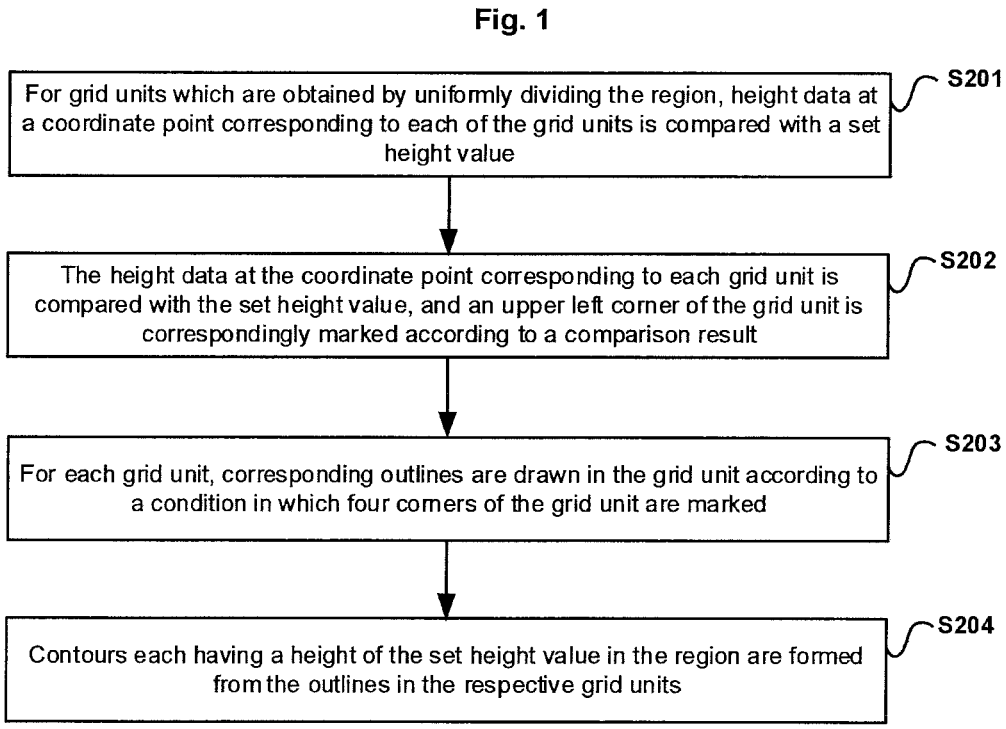
FIG. 2 is a flowchart of an exemplary method for drawing contours using cartography according to an embodiment of the present disclosure.

A flow of a specific method for drawing contours in the region by using cartography according to the height data at each coordinate point in the region, which is mentioned in the above step S102, may be as shown in FIG. 2 (but not limited thereto), and comprises the following steps.

In S201, for grid units which are obtained by uniformly dividing the region, height data at a coordinate point corresponding to each of the grid units is compared with a set height value.

Figures 3, 4:
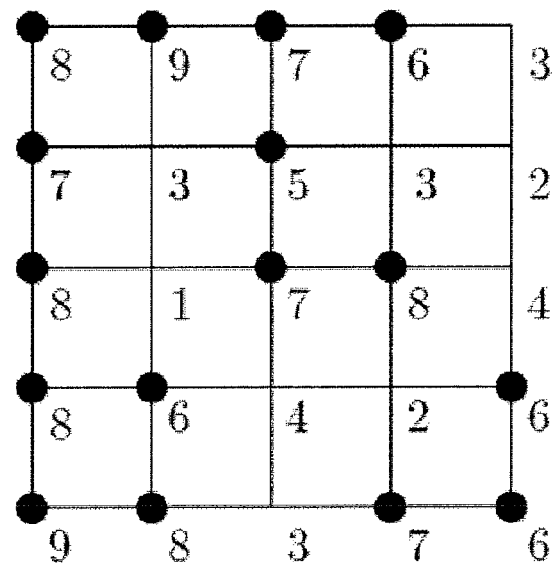
FIG. 3 is an exemplary diagram of grid units which are obtained by uniformly dividing a region according to an embodiment of the present disclosure.
FIG. 4 is an exemplary diagram of a condition in which upper left corners of grid units are marked according to an embodiment of the present disclosure.

For example, in the grid units which are obtained by uniform division as shown in FIG. 3, height data at a coordinate point corresponding to each of the grid units, i.e., density data of the human flow at the coordinate point corresponding to the grid unit, is marked at a vertex of the grid unit.

The height data at the coordinate point corresponding to each grid unit is compared with a set height value, wherein the set height value is equal to the set density value of the human flow. In this way, the density data of the human flow at the coordinate point corresponding to each grid unit is compared with the set density value of the human flow.

In S202, the height data at the coordinate point corresponding to each grid unit is compared with the set height value, and an upper left corner or another corner of the grid unit is correspondingly marked according to a comparison result.

Specifically, when height data at a coordinate point corresponding to one grid unit is greater than or equal to the set height value, an upper left corner of the grid unit may be marked in black. For example, if the height value is set to 5, a condition in which the upper left corners of the grid units shown in FIG. 3 are marked in black is shown in FIG. 4.

That is, when density data of the human flow at a coordinate point corresponding to one grid unit is greater than the set density value of the human flow, an upper left corner of the grid unit is marked in black.

Further, although the upper left corner of the grid unit is marked in black in the present embodiment, the present disclosure is not limited thereto. In some other embodiments, some other corner of the grid unit, such as a lower left corner, a lower right corner, or an upper right corner, may also be marked in black. In other words, as long as corners at the same positions are operated when all the grid units are processed, which corner is specifically marked in black does not affect an implementation of a final result.

In S203, for each grid unit, corresponding outlines are drawn in the grid unit according to a condition in which four corners of the grid unit are marked.

Figure 5A:
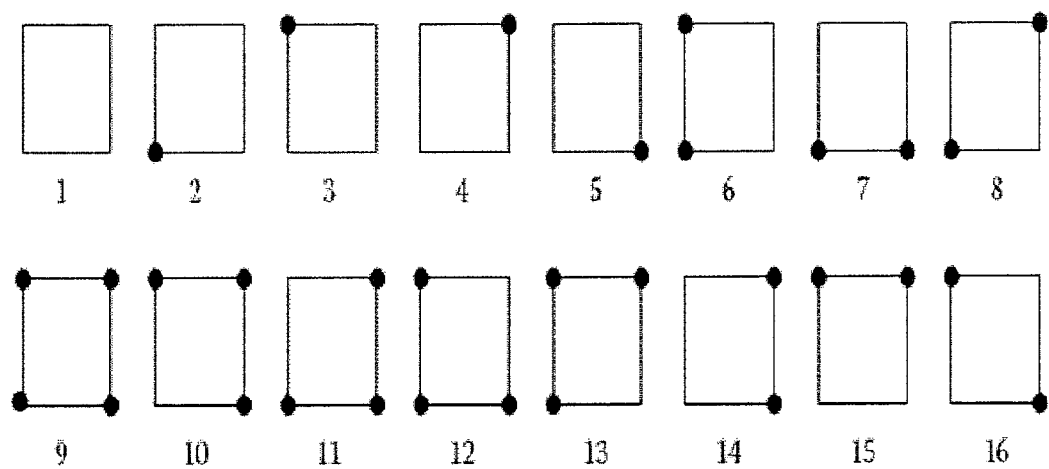
FIG. 5a is an exemplary diagram of sixteen conditions in which upper left corners of grid units are marked in black according to an embodiment of the present disclosure.
Figure 5B:
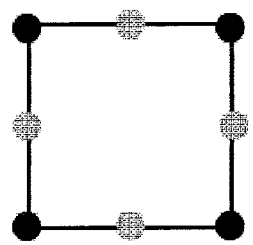
FIG. 5b is an exemplary diagram of midpoints of edges of a grid unit according to an embodiment of the present disclosure.
Figure 6:
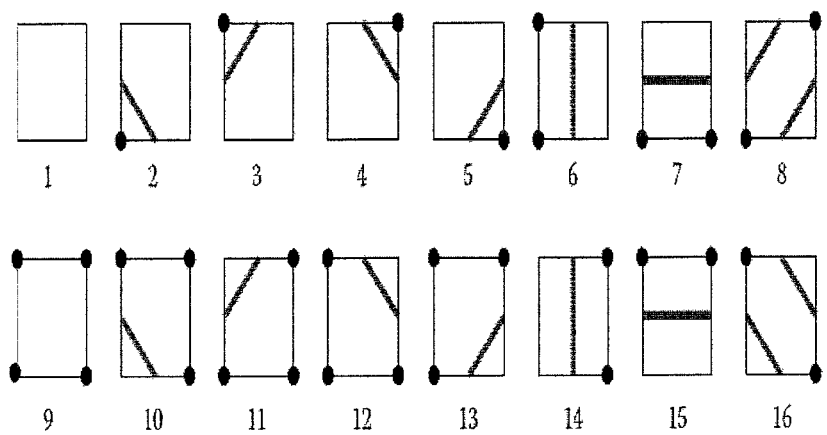
FIG. 6 is an exemplary diagram of sixteen manners in which outlines of grid units are drawn according to an embodiment of the present disclosure.

Specifically, each grid unit comprises four vertices, and there are $2^4=16$ conditions in which the grid unit having the four vertices is marked in black, as shown in FIG. 5a. Outlines may be drawn by connecting midpoints of edges of the grid unit as shown in FIG. 5b. The sixteen conditions in which the grid unit is marked in black may further correspond to sixteen manners in which the outlines are drawn, as shown in FIG. 6.

In S204, contours each having a height of the set height value in the region are formed from the outlines in the respective grid units.

Figure 7:
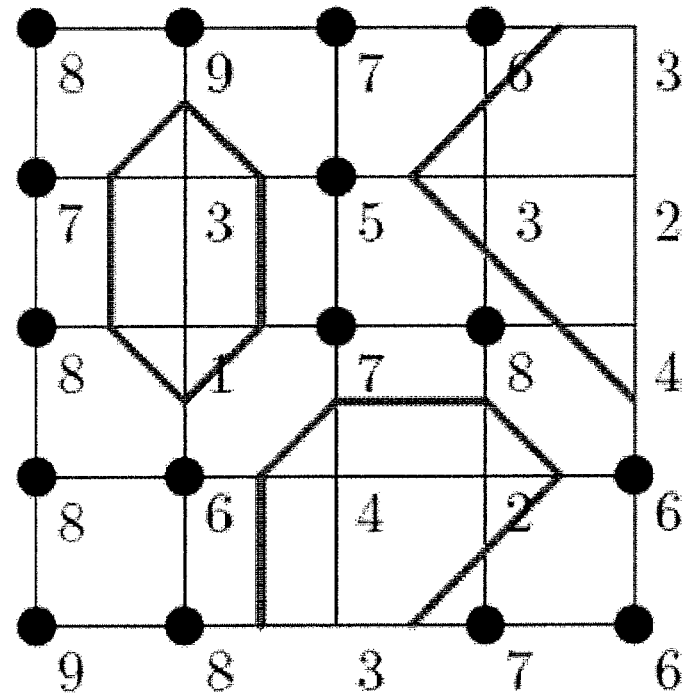
FIG. 7 is an exemplary diagram of forming contours from outlines of grid units according to an embodiment of the present disclosure.

As shown in FIG. 7, contours each having a height of the set height value, i.e., equidensity lines of the human flow each having a density of the set density value of the human flow, are formed from the outlines which are drawn according to the conditions in which each grid unit is marked in black as shown in FIG. 5a.

As may be seen from the above description, the algorithm for drawing contours in the region by using cartography is very simple, and mainly comprises simple numerical comparison and line drawing, without complicated convergence calculation, which greatly reduces the amount of calculation and calculation time, and may realize real-time determination and display of the hot zones.

Figure 8:
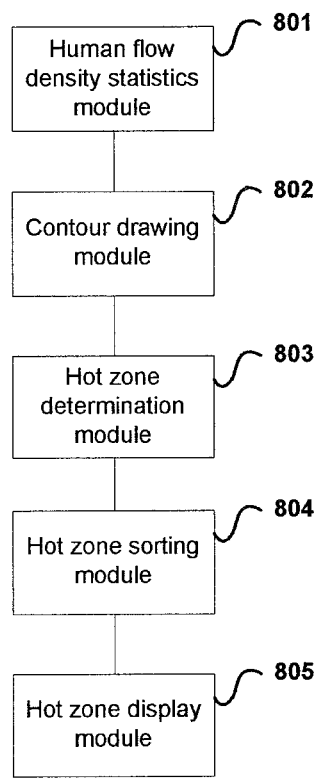
FIG. 8 is a block diagram of an internal structure of an exemplary apparatus for determining hot zones of a human flow based on cartography according to an embodiment of the present disclosure.

Based on the above method, an internal structure of an apparatus for determining hot zones of a human flow based on cartography according to an embodiment of the present disclosure may be shown in FIG. 8, and comprises a human flow density statistics module 801, a contour drawing module 802, and a hot zone determination module 803.

The human flow density statistics module 801 is configured to perform statistics on density data of the human flow at each coordinate point in a region for a period of time.

The contour drawing module 802 is configured to draw contours in the region by using cartography according to height data at each coordinate point after the density data of the human flow at the coordinate point which is count up by the human flow density statistics module 801 is used as the height data. A specific method for drawing the contours in the region by using cartography according to the height data at each coordinate point by the contour drawing module 802 may be known with reference to the flow of the method shown in FIG. 2 described above, and will not be described in detail here.

The hot zone determination module 803 is configured to determine the hot zones of the human flow in the region according to ranges enclosed by equidensity lines of the human flow after the contours drawn by the contour drawing module 802 are used as the equidensity lines of the human flow. Specifically, the hot zone determination module 803 may select ranges enclosed by equidensity lines of the human flow each having a hot degree greater than a set hot degree value as the hot zones of the human flow in the region; or select ranges enclosed by equidensity lines of the human flow each having a density of the human flow higher than a set threshold as the hot zones of the human flow in the region.

Alternatively, in some embodiments, the hot zone determination module 803 is configured to select ranges enclosed by equidensity lines of the human flow each having a hot degree greater than a set hot degree value as candidate hot zones; and determine candidate hot zones each having an area greater than a set area as the hot zones of the human flow in the region.

Further, the apparatus for determining hot zones of a human flow based on cartography according to the embodiment of the present disclosure may further comprise: a hot zone sorting module 804 and a hot zone display module 805.

The hot zone sorting module 804 is configured to sort the determined hot zones of the human flow according to hot degrees.

The hot zone display module 805 is configured to mark the respective hot zones of the human flow in different colors on a display interface according to a sorting result from the hot zone sorting module 804.

Figure 9:
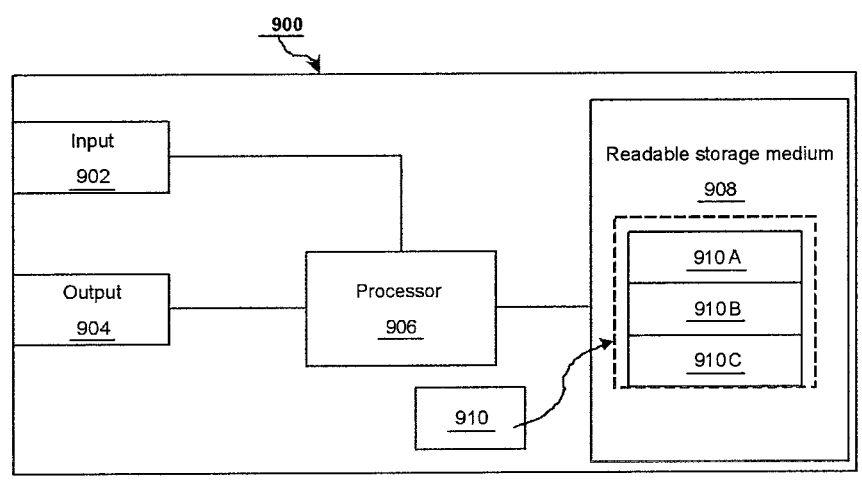
FIG. 9 is a hardware layout diagram of an exemplary apparatus for determining hot zones of a human flow based on cartography according to an embodiment of the present disclosure.

FIG. 9 is a diagram of a hardware arrangement of an exemplary apparatus 900 for determining hot zones of a human flow based on cartography according to an embodiment of the present disclosure. The hardware arrangement 900 comprises a processor 906 (for example, a Digital Signal Processor (DSP), a Central Processing Unit (CPU), etc.) The processor 906 may be a single processing unit or a plurality of processing units for performing different actions of the flow described herein. The arrangement 900 may further comprise an input unit 902 for receiving signals from other entities, and an output unit 904 for providing signals to other entities. The input unit 902 and the output unit 904 may be arranged as a single entity or separate entities.

Further, in some embodiments, the input unit 902 and the output unit 904 may further comprise a communicator to enable external communication with the processor 906, such as a wireless communication unit, a wired communication unit, etc. The wireless communication unit may be a communication unit which supports protocols such as Wi-Fi, Bluetooth, 3GPP series (comprising, for example, GSM, GPRS, CDMA, WCDMA, CDMA2000, TD-SCDMA, LTE, LTE-A, 5G NR, etc.), Wi-Max, etc. The wired communication unit may be a communication module which supports protocols such as Ethernet, USB, fiber optics, xDSL, etc. In some embodiments, the input unit 902 and/or the output unit 904 may also be an interface which is communicatively connected to an external communicator. In other words, in these embodiments, the exemplary apparatus 900 per se may not comprise a communicator, but may communicate with an external communicator through an interface to implement the same or similar functionality.

In addition, the arrangement 900 may comprise at least one readable storage medium 908 in a form of non-volatile or volatile memory, such as an Electrically Erasable Programmable Read-Only Memory (EEPROM), a flash memory, and/or a hard disk driver. The readable storage medium 908 comprises a computer program 910 which comprises codes/computer readable instructions that, when executed by the processor 906 in the arrangement 900, cause the hardware arrangement 900 and/or a device including the hardware arrangement 900 to perform, for example, flows described above in connection with FIGS. 1-7 and any variations thereof.

The computer program 910 may be configured with computer program codes, having for example architecture of computer program module 910A-910C. Therefore, the codes in the computer program of the arrangement 900 may comprise a module 910A configured to determine height data at each coordinate point in a region in the cartography sense based on density data of the human flow at the coordinate point for a period of time; a module 9108 configured to draw contours in the region by using cartography according to the height data; and a module 910C configured to determine the hot zones of the human flow in the region according to ranges enclosed by the drawn contours.

The computer program module may substantially perform various actions in the flows illustrated in FIGS. 1-7 to simulate an apparatus 800. In other words, when different computer program modules are executed in the processor 906, they may correspond to different units or modules in the apparatus 800.

While the code means in the embodiments disclosed above in connection with FIG. 9 are implemented as computer program modules which, when executed in the processor 906, cause the hardware arrangement 900 to perform the actions described above in connection with FIGS. 1-7, in alternative embodiments, at least one of the code means may be implemented at least in part as a hardware circuit.

The processor may be a single Central Processing Unit (CPU), but may also comprise two or more processing units. For example, the processor may comprise a general purpose microprocessor, an instruction set processor, and/or a related chipset and/or a dedicated microprocessor (for example, an Application Specific Integrated Circuit (ASIC)). The processor may also comprise an on-board memory for caching purposes. The computer program may be carried by a computer program product connected to the processor. The computer program product may comprise a computer-readable medium having stored thereon a computer program. For example, the computer program product may be a flash memory, a Random Access Memory (RAM), a Read Only Memory (ROM), or an EEPROM, and the computer program modules may, in an alternative embodiment, be distributed to different computer program products in a form of memory within the device.

In the technical solutions according to the embodiments of the present disclosure, after density data of the human flow at each coordinate point in the region is used as height data at the coordinate point, equidensity lines of the human flow may be obtained rapidly using a method for calculating contours in the cartography, and the hot zones may be determined based on the equidensity lines of the human flow. Since the algorithm of calculating contours in the cartography is simple and rapid, in the technical solutions according to the present disclosure, a small amount of calculation is realized, and the hot zones of the human flow may be rapidly determined, to realize the real-time calculation and display of the hot zones.

It can be understood by those skilled in the art that steps, measures, and schemes in various operations, methods and flows which have been discussed in the present disclosure can be alternated, changed, combined, or deleted. Further, other steps, measures, and schemes in various operations, methods, and flows which have been discussed in the present disclosure can also be alternated, changed, rearranged, decomposed, combined, or deleted. Further, steps, measures, and schemes in various operations, methods and flows in the related art which are disclosed in the present disclosure can also be alternated, changed, rearranged, decomposed, combined, or deleted.

It should be understood by those of ordinary skill in the art that the discussion of any of the above embodiments is merely exemplary and is not intended to suggest that the scope of the present disclosure (including the claims) is limited to these examples; and according to the idea of the present disclosure, the above embodiments or technical features in different embodiments can also be combined, the steps may be implemented in any order, and there are many other variations of different aspects of the present disclosure as described above, which are not provided in the details for the sake of conciseness. Therefore, any omissions, modifications, equivalent substitutions, improvements etc. made within the spirit and principle of the present disclosure should be included in the protection scope of the present disclosure.

I claim:

1. A computer-implemented method for determining hot zones of a human flow based on cartography, the method comprising:
   determining height data at each coordinate point in a region in the cartography sense based on density data of the human flow at the coordinate point for a period of time;
   drawing contours in the region by using cartography according to the height data; and
   determining the hot zones of the human flow in the region according to ranges enclosed by the drawn contours.

2. The method according to claim 1, wherein the step of determining height data at each coordinate point in a region in the cartography sense based on density data of the human flow at the coordinate point for a period of time comprises:
   using the density data of the human flow at each coordinate point directly as the height data at the corresponding coordinate point in the cartography sense.

3. The method according to claim 1, wherein the step of determining the hot zones of the human flow in the region according to ranges enclosed by the drawn contours comprises:
   determining the drawn contours as equidensity lines of the human flow; and determining the hot zones of the human flow in the region according to the ranges enclosed by the equidensity lines of the human flow.

4. The method according to claim 3, wherein the step of determining the hot zones of the human flow in the region according to the ranges enclosed by the equidensity lines of the human flow comprises:
selecting ranges enclosed by equidensity lines of the human flow each having a hot degree greater than a set hot degree value as the hot zones of the human flow in the region; or
selecting ranges enclosed by equidensity lines of the human flow each having a density of the human flow higher than a set threshold as the hot zones of the human flow in the region.

5. The method according to claim 3, wherein the step of determining the hot zones of the human flow in the region according to the ranges enclosed by the equidensity lines of the human flow comprises:
selecting ranges enclosed by equidensity lines of the human flow each having a hot degree greater than a set hot degree value as candidate hot zones; and
determining candidate hot zones each having an area greater than a set area as the hot zones of the human flow in the region.

6. The method according to claim 1, further comprising:
sorting the determined hot zones of the human flow according to hot degrees; and
marking the hot zones of the human flow in different colors on a display interface according to a sorting result.

7. The method according to claim 1, wherein the step of drawing contours in the region by using cartography according to the height data comprises:
for grid units which are obtained by uniformly dividing the region, comparing height data at a coordinate point corresponding to each of the grid units with a set height value;
marking, in response to height data at a coordinate point corresponding to a grid unit being greater than the set height value, an upper left corner of the grid unit in black;
drawing corresponding outlines in the grid unit according to conditions in which four corners of the grid unit are marked in black; and
forming contours in the region each having a height marked as the set height value from respective outlines in the grid units,
wherein the set height value is equal to a set density value of the human flow.

8. An apparatus for determining hot zones of a human flow based on cartography, the apparatus comprising:
a processor; and
a memory having stored thereon instructions, which when executed by the processor, cause the processor to:
determine height data at each coordinate point in a region in the cartography sense based on density data of the human flow at the coordinate point for a period of time;
draw contours in the region by using cartography according to the height data; and
determine the hot zones of the human flow in the region according to ranges enclosed by the drawn contours.

9. The apparatus according to claim 8, wherein the instructions, when executed by the processor, further cause the processor to:
use the density data of the human flow at each coordinate point directly as the height data at the corresponding coordinate point in the cartography sense.

10. The apparatus according to claim 8, wherein the instructions, when executed by the processor, further cause the processor to:
determine the drawn contours as equidensity lines of the human flow; and
determine the hot zones of the human flow in the region according to the ranges enclosed by the equidensity lines of the human flow.

11. The apparatus according to claim 10, wherein the instructions, when executed by the processor, further cause the processor to:
select ranges enclosed by equidensity lines of the human flow each having a hot degree greater than a set hot degree value as the hot zones of the human flow in the region; or
select ranges enclosed by equidensity lines of the human flow each having a density of the human flow higher than a set threshold as the hot zones of the human flow in the region.

12. The apparatus according to claim 10, wherein the instructions, when executed by the processor, further cause the processor to:
select ranges enclosed by equidensity lines of the human flow each having a hot degree greater than a set hot degree value as candidate hot zones; and
determine candidate hot zones each having an area greater than a set area as the hot zones of the human flow in the region.

13. The apparatus according to claim 10, wherein the instructions, when executed by the processor, further cause the processor to:
sort the determined hot zones of the human flow according to hot degrees; and
mark the hot zones of the human flow in different colors on a display interface according to a sorting result.

14. A non-transitory computer readable storage medium having stored thereon instructions which, when executed by a processor, enable the processor to perform the following operations:
determining height data at each coordinate point in a region in the cartography sense based on density data of the human flow at the coordinate point for a period of time;
drawing contours in the region by using cartography according to the height data; and
determining the hot zones of the human flow in the region according to ranges enclosed by the drawn contours.

15. The apparatus according to claim 10, wherein the instructions, when executed by the processor, further cause the processor to:
for grid units which are obtained by uniformly dividing the region, compare height data at a coordinate point corresponding to each of the grid units with a set height value;
mark, in response to height data at a coordinate point corresponding to a grid unit being greater than the set height value, an upper left corner of the grid unit in black;
draw corresponding outlines in the grid unit according to conditions in which four corners of the grid unit are marked in black; and
form contours in the region each having a height of the set height value from respective outlines in the grid units, wherein the set height value is equal to a set density value of the human flow.

16. The non-transitory computer readable storage medium according to claim 14, wherein the instructions, when executed by the processor, further cause the processor to:
use the density data of the human flow at each coordinate point directly as the height data at the corresponding coordinate point in the cartography sense.

17. The non-transitory computer readable storage medium according to claim 14, wherein the instructions, when executed by the processor, further cause the processor to:
determine the drawn contours as equidensity lines of the human flow; and
determine the hot zones of the human flow in the region according to the ranges enclosed by the equidensity lines of the human flow.

18. The non-transitory computer readable storage medium according to claim 17, wherein the instructions, when executed by the processor, further cause the processor to:
select ranges enclosed by equidensity lines of the human flow each having a hot degree greater than a set hot degree value as the hot zones of the human flow in the region; or
select ranges enclosed by equidensity lines of the human flow each having a density of the human flow higher than a set threshold as the hot zones of the human flow in the region.

19. The non-transitory computer readable storage medium according to claim 17, wherein the instructions, when executed by the processor, further cause the processor to:
select ranges enclosed by equidensity lines of the human flow each having a hot degree greater than a set hot degree value as candidate hot zones; and
determine candidate hot zones each having an area greater than a set area as the hot zones of the human flow in the region.

20. The non-transitory computer readable storage medium according to claim 17, wherein the instructions, when executed by the processor, further cause the processor to:
sort the determined hot zones of the human flow according to hot degrees; and
mark the hot zones of the human flow in different colors on a display interface according to a sorting result.

* * * * *